US012069175B2

(12) United States Patent
Zhang et al.

(10) Patent No.: US 12,069,175 B2
(45) Date of Patent: Aug. 20, 2024

(54) METHOD AND APPARATUS FOR BLOCKCHAIN COMMUNITY GOVERNANCE, DEVICE AND STORAGE MEDIUM

(71) Applicant: BEIJING BAIDU NETCOM SCIENCE TECHNOLOGY CO., LTD., Beijing (CN)

(72) Inventors: Lei Zhang, Beijing (CN); Bingxin Fan, Beijing (CN); Qi Zheng, Beijing (CN); Chunhui Wan, Beijing (CN); Wei Xiao, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 269 days.

(21) Appl. No.: 17/657,356

(22) Filed: Mar. 30, 2022

(65) Prior Publication Data
US 2022/0224536 A1 Jul. 14, 2022

(30) Foreign Application Priority Data

May 20, 2021 (CN) .......................... 202110550706.5

(51) Int. Cl.
*H04L 9/32* (2006.01)
*G06F 21/45* (2013.01)
(Continued)

(52) U.S. Cl.
CPC .......... *H04L 9/3213* (2013.01); *H04L 9/3239* (2013.01); *H04L 67/104* (2013.01);
(Continued)

(58) Field of Classification Search
CPC ....... H04L 9/3213; H04L 9/3239; H04L 9/38; H04L 9/50; H04L 67/104; H04L 2209/56;
(Continued)

(56) References Cited

U.S. PATENT DOCUMENTS

2020/0013027 A1* 1/2020 Zhu ........................... H04L 9/50
2020/0167764 A1* 5/2020 Lin ....................... H04L 9/3239
(Continued)

FOREIGN PATENT DOCUMENTS

| CN | 108846642 A | 11/2018 |
| CN | 108989357 A | 12/2018 |

(Continued)

OTHER PUBLICATIONS

Initial Crypto-asset Offerings (ICOs), tokenization and corporate governance, by Guegan et al., published Apr. 2019 (Year: 2019).*
(Continued)

*Primary Examiner* — Vu V Tran
(74) *Attorney, Agent, or Firm* — Hunton Andrews Kurth LLP

(57) ABSTRACT

Provided are a method and apparatus for blockchain community governance, a device and a storage medium. The method is described below. A community governance transaction request initiated by a blockchain account and a governance scene to which the community governance transaction request belongs are acquired. Community governance authority of the blockchain account in the governance scene is verified according to the governance scene and governance token resource information in the blockchain account. In a case where a community governance authority verification is successful, the community governance transaction request is executed.

13 Claims, 4 Drawing Sheets

(51) Int. Cl.
*G06F 21/64* (2013.01)
*G06Q 20/38* (2012.01)
*G06Q 40/04* (2012.01)
*H04L 9/00* (2022.01)
*H04L 67/104* (2022.01)
*H04L 9/38* (2006.01)

(52) U.S. Cl.
CPC ................. *H04L 9/38* (2013.01); *H04L 9/50* (2022.05); *H04L 2209/56* (2013.01)

(58) Field of Classification Search
CPC ....... G06F 21/45; G06F 21/64; G06Q 20/389; G06Q 40/04
See application file for complete search history.

(56) References Cited

U.S. PATENT DOCUMENTS

| | | | |
|---|---|---|---|
| 2020/0250177 A1 | 8/2020 | Padmanabhan | |
| 2020/0344132 A1 | 10/2020 | Padmanabhan | |
| 2021/0004777 A1* | 1/2021 | Kim | G06Q 30/0185 |
| 2021/0073913 A1* | 3/2021 | Ingargiola | H04L 67/104 |
| 2022/0276996 A1* | 9/2022 | Gaur | G06Q 20/401 |

FOREIGN PATENT DOCUMENTS

| | | |
|---|---|---|
| CN | 110096857 A | 8/2019 |
| CN | 111738712 A | 10/2020 |
| CN | 111861611 A | 10/2020 |

OTHER PUBLICATIONS

"First Chinese Office Action, The State Intellectual Property Office of People's Republic of China, issued to CN Application No. 202120550706.5, 10 pages."

"First Chinese Search Report, The State Intellectual Property Office of People's Republic of China, issued to CN Application No. 202120550706.5, 2 pages."

"Second Chinese Office Action, The State Intellectual Property Office of People's Republic of China, issued to CN Application No. 202120550706.5, 12 pages."

* cited by examiner

METHOD AND APPARATUS FOR BLOCKCHAIN COMMUNITY GOVERNANCE, DEVICE AND STORAGE MEDIUM

CROSS-REFERENCE TO RELATED APPLICATION(S)

This application claims priority to Chinese Patent Application No. 202110550706.5 filed May 20, 2021, the disclosure of which is incorporated herein by reference in its entirety.

TECHNICAL FIELD

The present disclosure relates to the field of computer technologies, in particular, to the field of the blockchain technology applicable to cloud computing and cloud services and, specifically, to a method and apparatus for blockchain community governance, a device and a storage medium.

BACKGROUND

The blockchain technology originates from a community organization, and a blockchain system operates in the manner of a community and is under the organization of the community. Any improvement to be made to the blockchain system or something needed to be determined requires the consensus of the whole network. Not only the accounting manner of a blockchain needs the consensus of the whole network, but also any change of rules needs the consensus reached in the whole network and the whole community.

In order to reach consensus among members in the blockchain community, a set of practical mechanisms are required to govern the blockchain community.

SUMMARY

The present disclosure provides a method and apparatus for blockchain community governance, a device and a storage medium.

According to an aspect of the present disclosure, a method for blockchain community governance is provided. The method includes steps below.

A community governance transaction request initiated by a blockchain account and a governance scene to which the community governance transaction request belongs are acquired.

Community governance authority of the blockchain account in the governance scene is verified according to the governance scene and governance token resource information in the blockchain account.

In a case where a community governance authority verification is successful, the community governance transaction request is executed.

According to another aspect of the present disclosure, an apparatus for blockchain community governance is provided. The apparatus includes a governance request acquisition module, a governance authority verify module and a community governance module.

The governance request acquisition module is configured to acquire a community governance transaction request initiated by a blockchain account and a governance scene to which the community governance transaction request belongs.

The governance authority verify module is configured to verify community governance authority of the blockchain account in the governance scene according to the governance scene and governance token resource information in the blockchain account.

The community governance module is configured to in a case where a community governance authority verification is successful, execute the community governance transaction request.

According to another aspect of the present disclosure, an electronic device is provided. The electronic device includes at least one processor and a memory communicatively connected to the at least one processor.

The memory stores instructions executable by the at least one processor to cause the at least one processor to perform the method for blockchain community governance according to any embodiment of the present disclosure.

According to another aspect of the present disclosure, a non-transitory computer-readable storage medium is provided. The storage medium stores computer instructions for causing a computer to perform the method for blockchain community governance according to any embodiment of the present disclosure.

According to another aspect of the present disclosure, a computer program product is provided. The computer program product includes a computer program which, when executed by a processor, implements the method for blockchain community governance according to any embodiment of the present disclosure.

According to the technology of the present disclosure, the stability of blockchain community governance can be improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are merely illustrative. Therefore, it will be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

The solution provided by the embodiments of the present disclosure is described in detail below in conjunction with the drawings.

Figure 1:
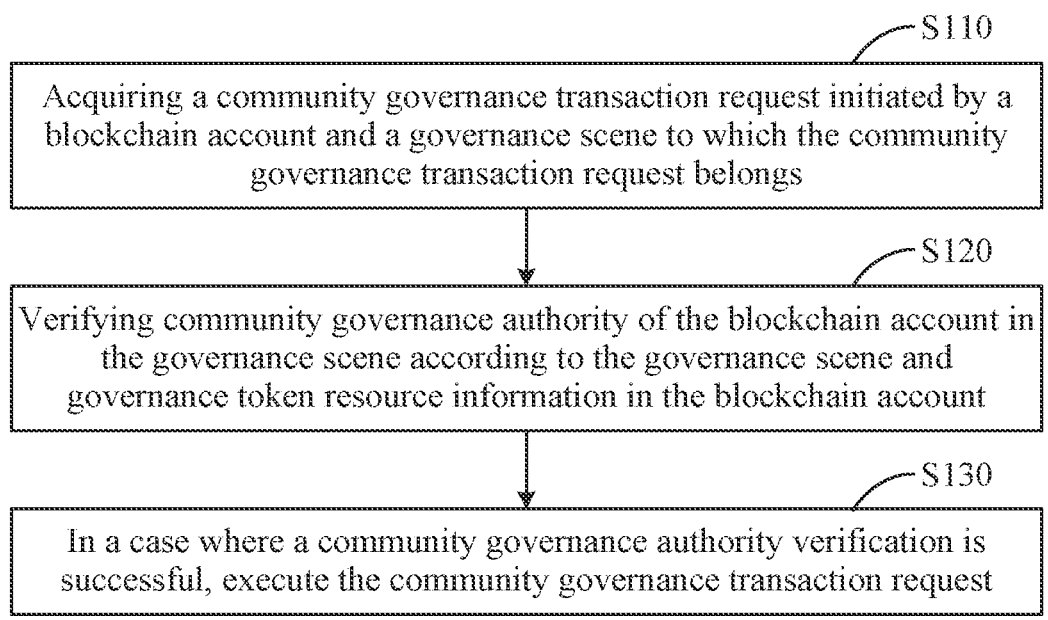
FIG. 1 is a diagram showing a method for blockchain community governance according to an embodiment of the present disclosure.

FIG. 1 is a diagram showing a method for blockchain community governance according to an embodiment of the present disclosure. The embodiment of the present disclosure may be applicable to the case of governance on a blockchain community. The method may be performed by an apparatus for blockchain community governance, which may be implemented in hardware and/or software, and may be configured in a blockchain node. Referring to FIG. 1, the method specifically includes steps described below.

In step S110, a community governance transaction request initiated by a blockchain account and a governance scene to which the community governance transaction request belongs are acquired.

In step S120, community governance authority of the blockchain account in the governance scene is verified according to the governance scene and governance token resource information in the blockchain account.

In step S130, in a case where a community governance authority verification is successful, the community governance transaction request is executed.

In the embodiment of the present disclosure, a blockchain system issues governance tokens specially for community governance of the blockchain system, regardless of other behaviors besides the community governance, such as a mining behavior, computing power control, etc. The community governance refers to the management on the blockchain system. The governance tokens may be used in at least two governance scenes, such as a system upgrade scene, a right confirmation scene, a consensus scene and the like. The embodiment of the present disclosure does not limit the governance scene.

Specifically, in the case where a community user needs to participate in any governance scene, a community governance transaction request may be initiated to a blockchain network by using a blockchain account of the community user for participating in a community governance task in the governance scene. The embodiment of the present disclosure does not specifically limit the manner of participation in community governance, and for example, the participation may be achieved through manners of submitting a proposal, voting, etc.

The governance token resource information is used for representing a governance token limit held by the blockchain account in each governance scene. For each governance scene, the governance token resource information may include a total governance token limit, a used governance token limit, an unused governance token limit and the like held in the governance scene.

The community governance authority in the governance scene is verified according to the governance token resource information in the blockchain account, for example, the unused governance token limit in any governance scene. In the case where the unused governance token limit in the governance scene satisfies the condition for participating in the community governance in the governance scene, the blockchain account is determined to have the community governance authority in the governance scene; in the case where the unused governance token limit does not satisfy the condition for participating in the community governance, the blockchain account is determined to not have the community governance authority in the governance scene and the community governance transaction request is rejected.

In the case where the community governance authority verification is successful, the community governance transaction request may be processed according to the participation manner of the blockchain account. Specifically, in the case where the participation manner is submitting a proposal, the community governance transaction request may carry the proposal content. In the process of executing the community governance transaction request, the proposal content may be written into a blockchain, other blockchain accounts are notified to vote on the proposal content, and whether the proposal content is allowed to pass is determined according to voting information. In the case where the participation manner is voting, the community governance transaction request may carry voting information. In the process of executing the community governance transaction request, the voting information may be written into a blockchain, and a voting result is determined in combination of voting information about other blockchain accounts.

The governance tokens specially for the community governance are issued, and the community governance authority of the blockchain account in each governance scene is verified according to the governance token resource information in the blockchain account, so that the blockchain account may participate in the community governance of each governance scene through the held governance tokens, and thus the stability of the community governance and the stability of the blockchain system are improved.

In the related art, for a public chain represented by a proof of work (POW) consensus mechanism, community governance is jointly participated by technical communities and miners. The technical communities control the authority for code updating, the miners control the computing power, and the technical communities and the miners counterbalance each other and jointly negotiate to participate in governance. However, different economic interests between the technical communities and the miners may cause community fragmentation. For a public chain represented by a proof of stake (POS) consensus mechanism, community governance is mainly participated by native tokens. However, in the POS consensus mechanism, individual institutions or individuals may hold a large number of native tokens. If more than 51% of the tokens are controlled by an individual institution or an individual, it will lead to dictatorship of the community. For an alliance chain and a private chain, community governance is performed in the form of parliament, and members of a community committee negotiate for and vote on important resolutions offline in the manner of parliament. The right of the community governance is fully controlled by a few members, such as the community committee. Users other than the community committee may not participate in the community governance, and thus the centralization degree is relatively high.

According to the technical solution of the embodiment of the present disclosure, the blockchain system issues the governance tokens specially for the community governance, and the community governance in each governance scene may be participated by governance tokens held in each governance scene. That is, the governance tokens can be used in each governance scene, so that the stability of the community governance and the stability of the blockchain system may be improved.

In an optional implementation, the method further includes the step described below. Transaction fees of the community governance transaction request are charged from native tokens of the blockchain account, where the native tokens are different from governance tokens.

For the blockchain system with native tokens, the transaction fees are further charged from the native tokens of the blockchain account. The governance tokens are specially used for participating in the community governance, and the native tokens are used for participating in tasks other than the community governance. The community governance and the native tokens are independent of each other, so that the community governance can be prevented from being affected by the native tokens, and the stability of the blockchain system is further improved.

Figure 2:
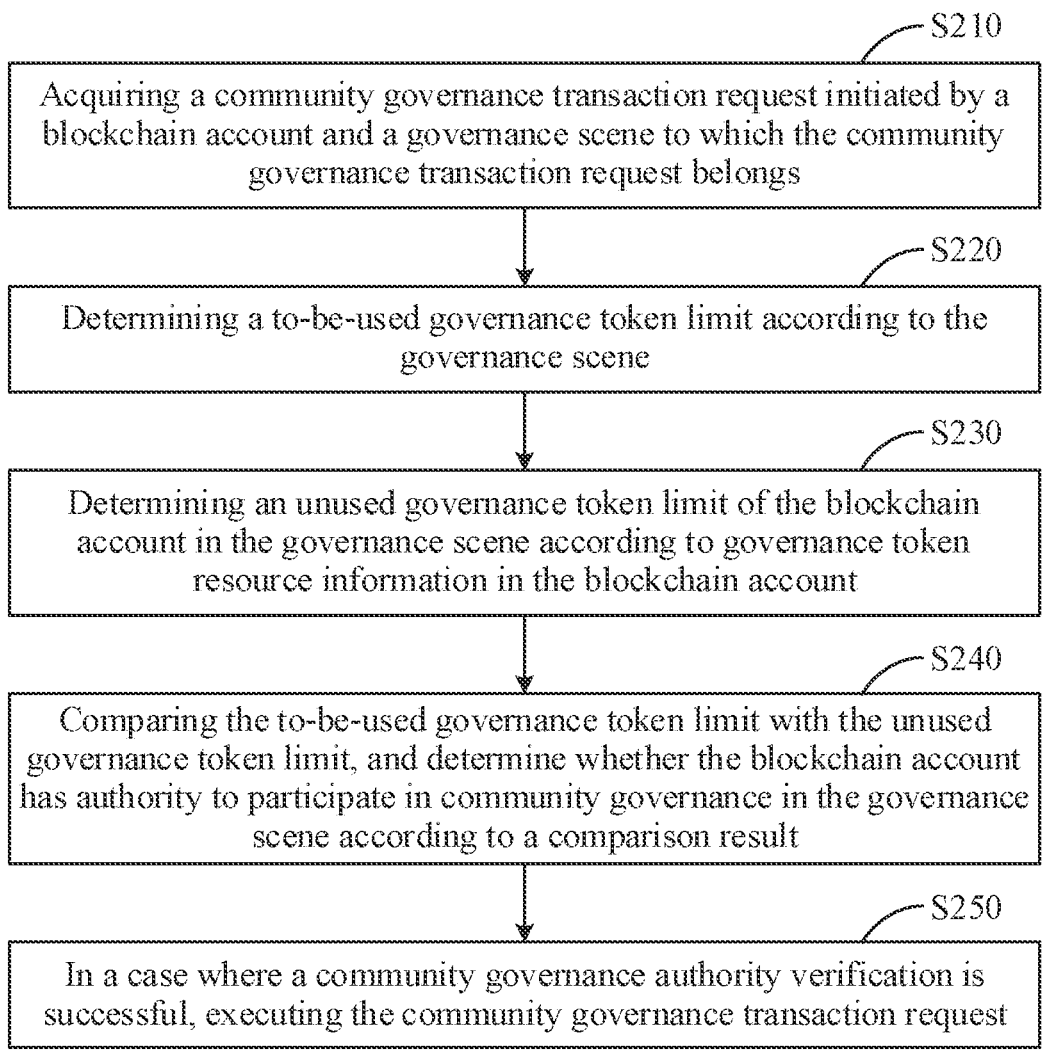
FIG. 2 is a diagram showing another method for blockchain community governance according to an embodiment of the present disclosure.

FIG. 2 is a diagram showing another method for blockchain community governance according to an embodiment of the present disclosure. The embodiment is an optional solution provided based on the preceding embodiment. Referring to FIG. 2, the method for blockchain community governance provided in the embodiment includes steps described below.

In step S210, a community governance transaction request initiated by a blockchain account and a governance scene to which the community governance transaction request belongs are acquired.

In step S220, a to-be-used governance token limit is determined according to the governance scene.

In step S230, an unused governance token limit of the blockchain account in the governance scene is determined according to governance token resource information in the blockchain account.

In step S240, the to-be-used governance token limit is compared with the unused governance token limit, and whether the blockchain account has authority to participate in community governance in the governance scene is determined according to a comparison result.

In step S250, in a case where a community governance authority verify is successful, the community governance transaction request is executed.

The to-be-used governance token limit is a governance token limit required to be used by the community governance transaction request and may be the threshold for the blockchain account to participate in the community governance. The to-be-used governance token limit may be related to the governance scene to which the community governance transaction request belongs, that is, different community governance transaction requests belonging to different governance scenes require different governance token thresholds. The governance token resource information may include unused governance token limits in different governance scenes. Whether the blockchain account has the authority to participate in the community governance in the governance scene is determined according to the comparison result between the unused governance token limit and the to-be-used governance token limit in the governance scene. Only if the unused governance token limit is equal to or greater than the to-be-used governance token limit, the blockchain account is allowed to participate in the community governance, which can prevent the blockchain account from abusing the community governance authority, and further improve the stability of the community governance.

In an optional implementation, before the community governance transaction request is executed, the to-be-used governance token limit in the governance scene is locked; and in a case where a completion of a community governance task to which the community governance transaction request belongs is detected, the to-be-used governance token limit is unlocked, and the to-be-used governance token limit is returned to the governance scene.

Specifically, it may be that in the case where the community governance transaction request is detected, the to-be-used governance token limit in the governance scene is locked and is in a disabled state. An example is illustrated in which an available governance token limit in the governance scene includes 60 governance tokens, and the to-be-used governance token limit includes 20 governance tokens. During the lock of the to-be-used governance token limit, the available governance token limit in the governance scene is updated to 40. Moreover, in the case where the community governance task is completed, locked governance tokens of the relevant blockchain account may be unlocked, and the unlocked governance tokens are returned to the relevant governance scene of the relevant blockchain account. The example is still illustrated in which the available governance token limit in the governance scene includes 60 governance tokens, and the to-be-used governance token limit includes 20 governance tokens. In the case where the community governance task is completed, the available governance token limit in the governance scene is restored to 60 governance tokens.

The community governance task in the governance scene may be associated with community governance transaction requests initiated by at least two blockchain accounts on the governance scene, and after each community governance transaction request is executed, an execution result of the community governance task can be determined according to an execution result of each community governance transaction request, and it can be determined that the community governance task is completed. A proposal-type community governance task is taken as an example. In the case where a voting result of the proposal content is determined, it can be determined that the community governance task is completed. Before the community governance transaction request is executed, the governance tokens in the governance scene are locked, so that the locked governance tokens cannot participate in the community governance, and abusing the community governance authority in the governance scene can be avoided. Moreover, in a case where the community governance task to which the community governance transaction request belongs is completed, the governance tokens in the governance scene are unlocked, so that the participation in the community governance does not consume the governance tokens, that is, the community governance authority of the governance scene is not consumed, and thereby the distribution mechanism of the governance tokens is simplified.

In an optional implementation, the method further includes the step described below. The blockchain account is allocated governance tokens according to a blockchain genesis file.

Specifically, the initial allocation of the governance tokens may be performed during the blockchain initialization process. Allocation information may be acquired from the blockchain genesis file. Moreover, the initial allocation of the governance tokens is performed only once, so that the distribution mechanism of the governance tokens can be simplified.

Unused governance token limits in different governance scenes are independent of each other. Specifically, usage behaviors of governance tokens in different governance scenes are independent of each other, each governance scene has an unused governance token limit of the each governance scene, and the unused governance token limits in different governance scenes are independent of each other.

An example is illustrated in which a certain blockchain account has 100 governance tokens in the initialization process. Accordingly, the unused governance token limit of the account in each governance scene is 100. If the blockchain account initiates a community governance transaction request in a system upgrade scene and locks 60 governance tokens in the system upgrade scene, the unused governance token limit of the account in the system upgrade scene is updated to 40 while unused governance token limits of the account in other governance scenes are still 100. The usage behaviors of the governance tokens in different governance scenes are independent of each other, so that governance requirements of different governance scenes can be satisfied. Moreover, different governance scenes are independent of each other, so that the mutual impact of different governance scenes can be avoided, and a function of one coin with multiple purposes can be achieved.

According to the technical solution of the embodiment of the present disclosure, governance tokens may participate in community governance in different governance scenes, and different governance scenes are independent of each other, so that a function of one coin with multiple purposes can be achieved. In addition, the initialization, locking and unlocking of the governance tokens are further disclosed, and thus the distribution mechanism of the governance tokens is simplified.

Figure 3:
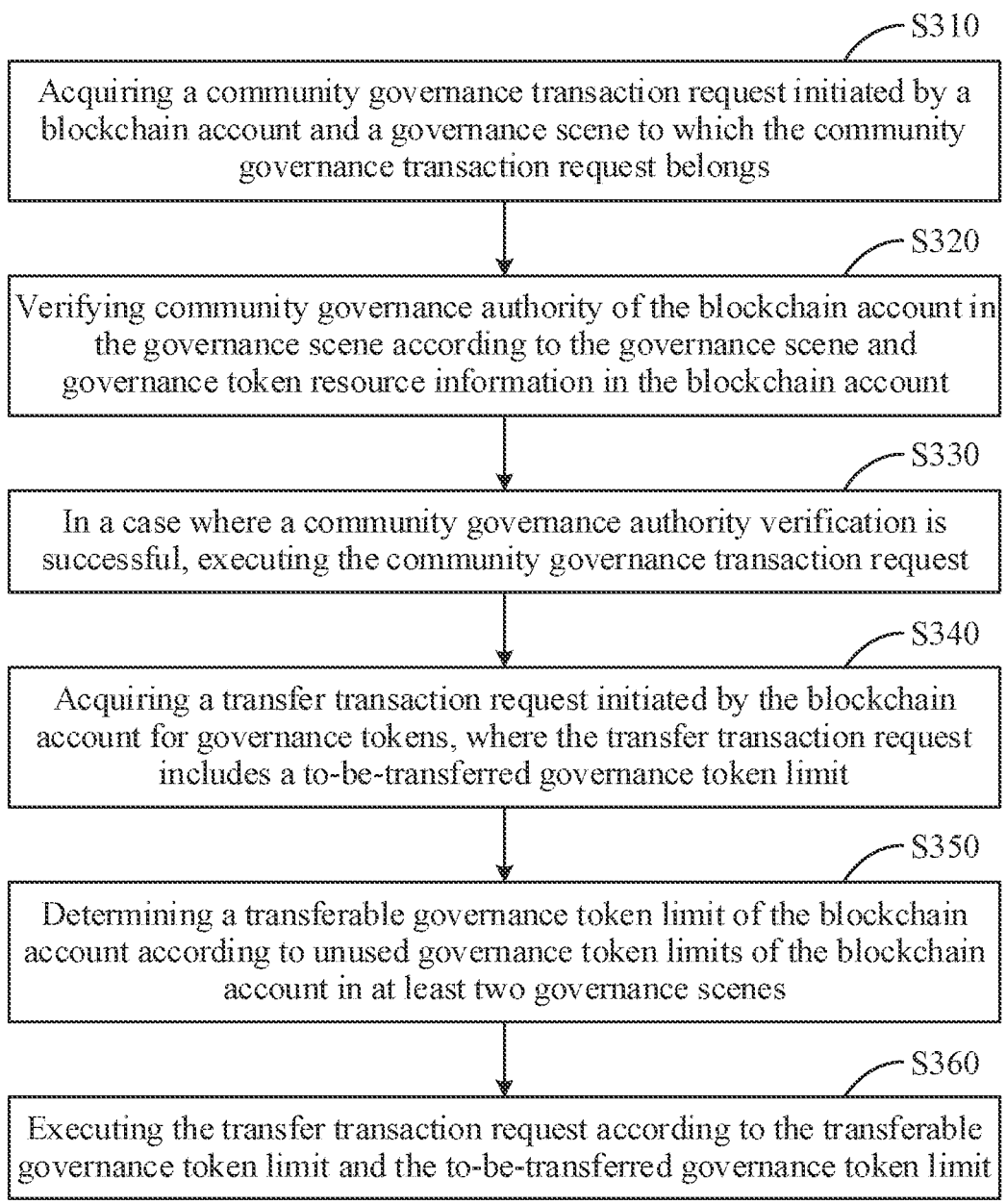
FIG. 3 is a diagram showing another method for blockchain community governance according to an embodiment of the present disclosure.

FIG. 3 is a diagram showing another method for blockchain community governance according to an embodiment of the present disclosure. The embodiment is an optional solution provided based on the preceding embodiment. Referring to FIG. 3, the method for blockchain community governance provided in the embodiment includes steps described below.

In step S310, a community governance transaction request initiated by a blockchain account and a governance scene to which the community governance transaction request belongs are acquired.

In step S320, community governance authority of the blockchain account in the governance scene is verified according to the governance scene and governance token resource information in the blockchain account.

In step S330, in a case where a community governance authority verification is successful, the community governance transaction request is executed.

In step S340, a transfer transaction request initiated by the blockchain account for governance tokens is acquired, where the transfer transaction request includes a to-be-transferred governance token limit.

In step S350, a transferable governance token limit of the blockchain account is determined according to unused governance token limits of the blockchain account in at least two governance scenes.

In step S360, the transfer transaction request is executed according to the transferable governance token limit and the to-be-transferred governance token limit.

In the embodiment of the present disclosure, governance token transfer is further supported. In the case where the transferable governance token limit is equal to or greater than the to-be-transferred governance token limit, the to-be-transferred governance token limit is transferred by a transfer initiator account to a transfer recipient account. In the case where the transferable governance token limit is less than the to-be-transferred governance token limit, the execution of the transfer transaction request is rejected. The flexibility of community governance can be improved by the governance token transfer.

In an optional implementation, the step in which a transferable governance token limit of the blockchain account is determined according to unused governance token limits of the blockchain account in at least two governance scenes includes the step described below. A minimum limit of the unused governance token limits of the blockchain account in the at least two governance scenes is determined as the transferable governance token limit of the blockchain account.

Specifically, the unused governance token limits of the blockchain account in the at least two governance scenes are respectively acquired to obtain at least two unused governance token limits, and the minimum limit of the at least two unused governance token limits is determined as the transferable governance token limit. The minimum limit of the at least two unused governance token limits is determined as the transferable governance token limit, so that the community governance can be prevented from being disturbed by the transfer transaction of the governance tokens, that is, conflicts between the transfer transaction request and the community governance transaction request can be prevented, and thus the stability of the blockchain system can be further improved.

The technical solution of the embodiment of the present disclosure further supports the governance token transfer, so that the flexibility of the community governance can be improved. Moreover, the minimum limit of the at least two unused governance token limits is determined as the transferable governance token limit, so that the community governance can be further prevented from being disturbed by the transfer transaction of the governance tokens.

Figure 4:
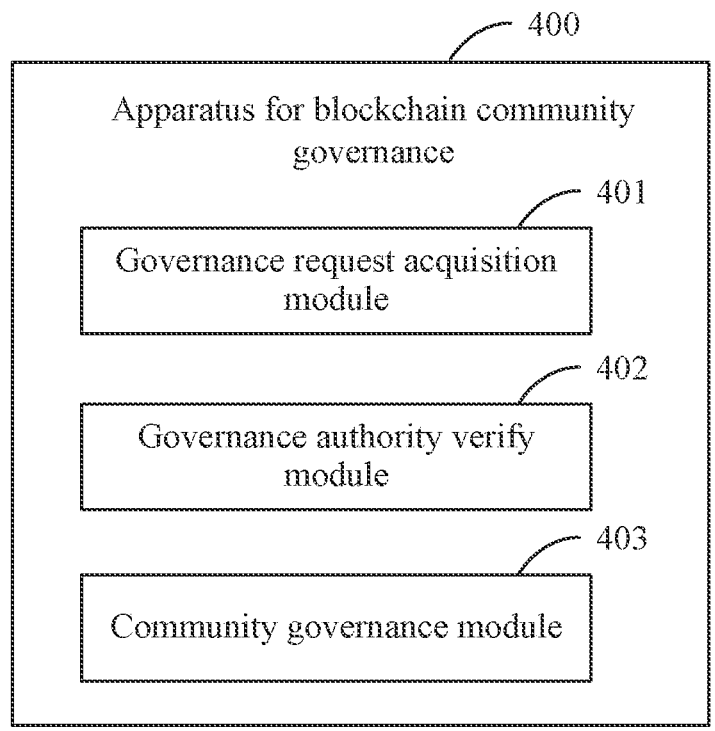
FIG. 4 is a schematic diagram of an apparatus for blockchain community governance according to an embodiment of the present disclosure.

FIG. 4 is a schematic diagram of an apparatus for blockchain community governance according to an embodiment of the present disclosure. The embodiment may be applied to the case of governance on a blockchain community, and the apparatus is configured in a blockchain node and may implement the method for blockchain community governance according to any embodiment of the present disclosure. Referring to FIG. 4, the apparatus 400 for blockchain community governance specifically includes a governance request acquisition module 401, a governance authority verify module 402 and a community governance module 403.

The governance request acquisition module 401 is configured to acquire a community governance transaction request initiated by a blockchain account and a governance scene to which the community governance transaction request belongs.

The governance authority verify module 402 is configured to verify community governance authority of the blockchain account in the governance scene according to the governance scene and governance token resource information in the blockchain account.

The community governance module 403 is configured to in a case where a community governance authority verification is successful, execute the community governance transaction request.

In an optional implementation, the governance authority verify module 402 includes a to-be-used amount unit, an unused amount unit and an amount comparison unit.

The to-be-used amount unit is configured to determine a to-be-used governance token limit according to the governance scene.

The unused amount unit is configured to determine an unused governance token limit of the blockchain account in the governance scene according to the governance token resource information in the blockchain account.

The amount comparison unit is configured to compare the to-be-used governance token limit with the unused governance token limit, and determine whether the blockchain account has authority to participate in community governance in the governance scene according to a comparison result.

In an optional implementation, the community governance module 403 further includes a governance token locking unit and a governance token unlocking unit.

The governance token locking unit is configured to before executing the community governance transaction request, lock the to-be-used governance token limit in the governance scene.

The governance token unlocking unit is configured to in a case where it is detected that a community governance task to which the community governance transaction request belongs is completed, unlock the to-be-used governance token limit, and return the to-be-used governance token limit to the governance scene.

In an optional implementation, unused governance token limits in different governance scenes are independent of each other.

In an optional implementation, the apparatus 400 for blockchain community governance further includes a native token charging module.

The native token charging module is configured to charge transaction fees of the community governance transaction request from native tokens of the blockchain account, where the native tokens are different from governance tokens.

In an optional implementation, the apparatus 400 for blockchain community governance further includes a governance token transfer module. The governance token transfer module includes a transfer request acquisition unit, a transferable amount determination unit and a transfer request execution unit.

The transfer request acquisition unit is configured to acquire a transfer transaction request initiated by the blockchain account for governance tokens, where the transfer transaction request includes a to-be-transferred governance token limit.

The transferable amount determination unit is configured to determine a transferable governance token limit of the blockchain account according to unused governance token limits of the blockchain account in at least two governance scenes.

The transfer request execution unit is configured to execute the transfer transaction request according to the transferable governance token limit and the to-be-transferred governance token limit.

In an optional implementation, the transferable amount determination unit is specifically configured to perform the operation described below.

A minimum limit of the unused governance token limits of the blockchain account in the at least two governance scenes is determined as the transferable governance token limit of the blockchain account.

According to the technical solution of the embodiment, governance tokens are issued to enable blockchain community users to participate in community governance, a function of one coin with multiple purposes is achieved, and governance requirements of different governance scenes are satisfied.

According to the embodiments of the present disclosure, the present disclosure further provides an electronic device, a readable storage medium and a computer program product.

Figure 5:
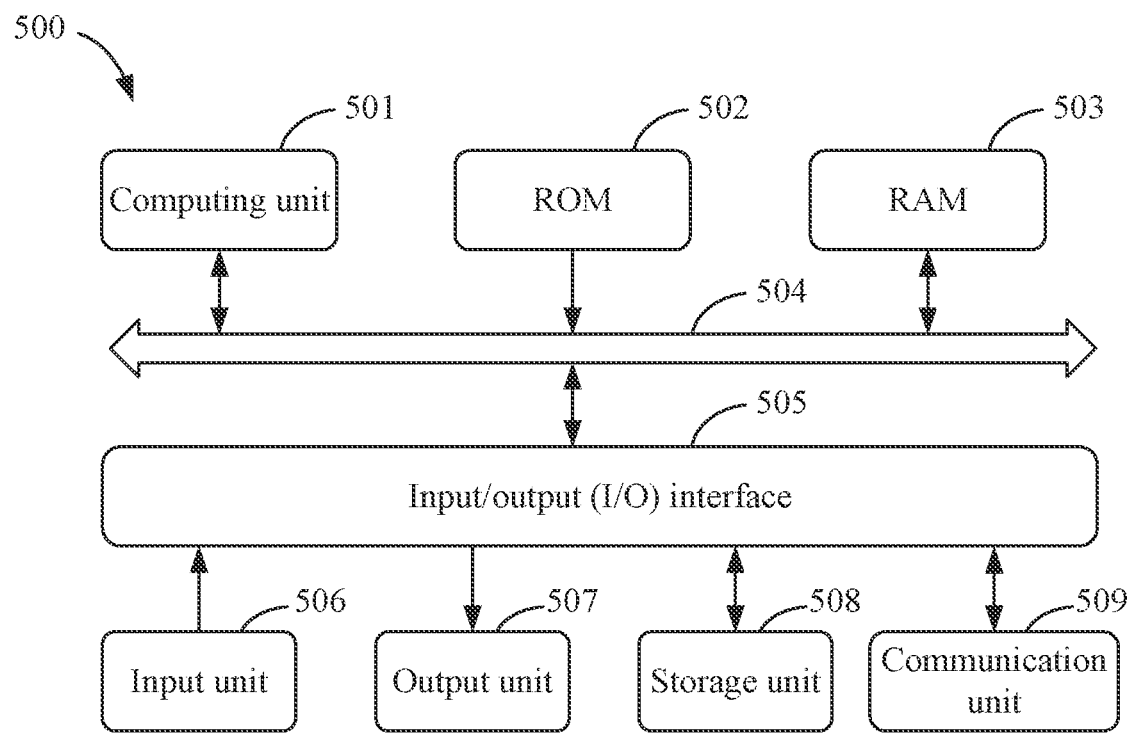
FIG. 5 is a block diagram of an electronic device for implementing a method for blockchain community governance according to an embodiment of the present disclosure.

FIG. 5 is a block diagram of an exemplary electronic device 500 that may be configured to implement the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various types of appropriate operations and processing based on a computer program stored in a read-only memory (ROM) 502 or a computer program loaded from a storage unit 508 to a random-access memory (RAM) 503. Various programs and data required for operations of the device 500 may also be stored in the RAM 503. The computing unit 501, the ROM 502 and the RAM 503 are connected to each other by a bus 504. An input/output (I/O) interface 505 is also connected to the bus 504.

Multiple components in the device 500 are connected to the I/O interface 505. The multiple components include an input unit 506 such as a keyboard and a mouse, an output unit 507 such as various types of displays and speakers, the storage unit 508 such as a magnetic disk and an optical disk, and a communication unit 509 such as a network card, a modem or a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning model algorithms, a digital signal processor (DSP) and any appropriate processor, controller and microcontroller. The computing unit 501 executes various preceding methods and processing, such as the method for blockchain community governance. For example, in some embodiments, the method for blockchain community governance may be implemented as a computer software program tangibly contained in a machine-readable medium such as the storage unit 508. In some embodiments, part or all of the computer program may be loaded and/or installed on the device 500 via the ROM 502 and/or the communication unit 509. When the computer program is loaded to the RAM 503 and executed by the computing unit 501, one or more steps of the preceding method for blockchain community governance may be executed. Alternatively, in other embodiments, the computing unit 501 may be configured, in any other suitable manner (for example, by means of firmware), to execute the method for blockchain community governance.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the present disclosure may be compiled in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations, and substitutions may be made depending on design requirements and other factors. Any modifications, equivalent substitutions, improvements and the like made within the spirit and principle of the present disclosure are within the scope of the present disclosure.

What is claimed is:

1. A method for blockchain community governance, comprising:
    acquiring a community governance transaction request initiated by a blockchain account and a governance scene to which the community governance transaction request belongs;
    verifying community governance authority of the blockchain account in the governance scene according to the governance scene and governance token resource information in the blockchain account; and
    in a case where a community governance authority verification is successful, executing the community governance transaction request;
    wherein the verifying the community governance authority of the blockchain account in the governance scene according to the governance scene and the governance token resource information in the blockchain account comprises:
    determining a to-be-used governance token limit according to the governance scene;
    determining an unused governance token limit of the blockchain account in the governance scene according to the governance token resource information in the blockchain account; and
    comparing the to-be-used governance token limit with the unused governance token limit, and determining whether the blockchain account has authority to participate in community governance in the governance scene according to a comparison result.

2. The method according to claim 1, further comprising:
    before the executing the community governance transaction request, locking the to-be-used governance token limit in the governance scene; and
    in a case where a completion of a community governance task to which the community governance transaction request belongs is detected, unlocking the to-be-used governance token limit, and returning the to-be-used governance token limit to the governance scene.

3. The method according to claim 1, wherein unused governance token limits in different governance scenes are independent of each other.

4. The method according to claim 1, further comprising:
charging transaction fees of the community governance transaction request from native tokens of the blockchain account, wherein the native tokens are different from governance tokens.

5. The method according to claim 1, further comprising:
acquiring a transfer transaction request initiated by the blockchain account for governance tokens, wherein the transfer transaction request comprises a to-be-transferred governance token limit;
determining a transferable governance token limit of the blockchain account according to unused governance token limits of the blockchain account in at least two governance scenes; and
executing the transfer transaction request according to the transferable governance token limit and the to-be-transferred governance token limit.

6. The method according to claim 5, wherein the determining the transferable governance token limit of the blockchain account according to the unused governance token limits of the blockchain account in the at least two governance scenes comprises:
determining a minimum limit of the unused governance token limits of the blockchain account in the at least two governance scenes as the transferable governance token limit of the blockchain account.

7. An electronic device, comprising:
at least one processor; and
a memory communicatively connected to the at least one processor;
wherein the memory stores instructions executable by the at least one processor to cause the at least one processor to perform:
acquiring a community governance transaction request initiated by a blockchain account and a governance scene to which the community governance transaction request belongs;
verifying community governance authority of the blockchain account in the governance scene according to the governance scene and governance token resource information in the blockchain account; and
in a case where a community governance authority verification is successful, executing the community governance transaction request;
wherein the verifying the community governance authority of the blockchain account in the governance scene according to the governance scene and the governance token resource information in the blockchain account comprises:
determining a to-be-used governance token limit according to the governance scene;
determining an unused governance token limit of the blockchain account in the governance scene according to the governance token resource information in the blockchain account; and
comparing the to-be-used governance token limit with the unused governance token limit, and determining whether the blockchain account has authority to participate in community governance in the governance scene according to a comparison result.

8. The electronic device according to claim 7, further comprising:
before the executing the community governance transaction request, locking the to-be-used governance token limit in the governance scene; and
in a case where a completion of a community governance task to which the community governance transaction request belongs is detected, unlocking the to-be-used governance token limit, and returning the to-be-used governance token limit to the governance scene.

9. The electronic device according to claim 7, wherein unused governance token limits in different governance scenes are independent of each other.

10. The electronic device according to claim 7, further comprising:
charging transaction fees of the community governance transaction request from native tokens of the blockchain account, wherein the native tokens are different from governance tokens.

11. The electronic device according to claim 7, further comprising:
acquiring a transfer transaction request initiated by the blockchain account for governance tokens, wherein the transfer transaction request comprises a to-be-transferred governance token limit;
determining a transferable governance token limit of the blockchain account according to unused governance token limits of the blockchain account in at least two governance scenes; and
executing the transfer transaction request according to the transferable governance token limit and the to-be-transferred governance token limit.

12. The electronic device according to claim 11, wherein the determining the transferable governance token limit of the blockchain account according to the unused governance token limits of the blockchain account in the at least two governance scenes comprises:
determining a minimum limit of the unused governance token limits of the blockchain account in the at least two governance scenes as the transferable governance token limit of the blockchain account.

13. A non-transitory computer-readable storage medium storing computer instructions for causing a computer to perform:
acquiring a community governance transaction request initiated by a blockchain account and a governance scene to which the community governance transaction request belongs;
verifying community governance authority of the blockchain account in the governance scene according to the governance scene and governance token resource information in the blockchain account; and
in a case where a community governance authority verification is successful, executing the community governance transaction request;
wherein the verifying the community governance authority of the blockchain account in the governance scene according to the governance scene and the governance token resource information in the blockchain account comprises:
determining a to-be-used governance token limit according to the governance scene;
determining an unused governance token limit of the blockchain account in the governance scene according to the governance token resource information in the blockchain account; and comparing the to-be-used governance token limit with the unused governance token limit, and determining whether the blockchain account has authority to participate in community governance in the governance scene according to a comparison result.

\* \* \* \* \*